(12) United States Patent
Le et al.

(10) Patent No.: US 10,767,766 B2
(45) Date of Patent: Sep. 8, 2020

(54) DISCHARGE VALVE SYSTEM AND METHOD

(71) Applicant: Fluidmaster, Inc., San Juan Capistrano, CA (US)

(72) Inventors: Tuan Le, Fountain Valley, CA (US); Joseph Han, Irvine, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 0 days.

(21) Appl. No.: 16/151,306

(22) Filed: Oct. 3, 2018

(65) Prior Publication Data

US 2019/0101216 A1  Apr. 4, 2019

Related U.S. Application Data

(60) Provisional application No. 62/567,653, filed on Oct. 3, 2017.

(51) Int. Cl.
*E03D 1/14* (2006.01)
*F16K 3/02* (2006.01)
(Continued)

(52) U.S. Cl.
CPC ............ *F16K 3/0281* (2013.01); *F04B 43/02* (2013.01); *F16K 1/26* (2013.01); *F16K 1/304* (2013.01);
(Continued)

(58) Field of Classification Search
CPC ......... E03D 1/302; E03D 1/304; E03D 1/142; E03D 1/32; E03D 3/10; E03D 3/06;
(Continued)

(56) References Cited

U.S. PATENT DOCUMENTS 2,838,765 A * 6/1958 Hosking ................. E03D 1/302
4/407
4,149,283 A * 4/1979 Knudtson ................. E03D 3/12
4/249
(Continued)

FOREIGN PATENT DOCUMENTS

CN        201241373 Y     5/2009
EP         1719846 B1    12/2016
(Continued)

OTHER PUBLICATIONS

International Search Report and Written Opinion for International Application No. PCT/US2018/054267, dated Feb. 1, 2019, 13 pages.

*Primary Examiner* — Craig J Price
(74) *Attorney, Agent, or Firm* — Greenberg Traurig, LLP

(57) ABSTRACT

Some embodiments include a fluid valve assembly with an outlet base dimensioned to be positioned through a drain in a fluid tank, and a float assembly including a moveable float. The moveable float can form a fluid-tight seal at a first end when the moveable float is coupled to the outlet base, and a flow opening when the moveable float is at least partially decoupled from the outlet base. Some embodiments include a housing positioned with the moveable float, where the housing encloses a suction device coupled to a moveable piston. Some embodiments include an actuable diaphragm positioned in the outlet base, and a compressed air tube or passageway coupled to one side the actuable diaphragm. In some embodiments, the actuable diaphragm is configured and arranged to be actuated by compressed air to move the moveable piston.

14 Claims, 7 Drawing Sheets

(51) Int. Cl.
*F04B 43/02* (2006.01)
*F16K 1/26* (2006.01)
*F16K 7/02* (2006.01)
*F16K 33/00* (2006.01)
*F16K 1/30* (2006.01)
*F16K 31/22* (2006.01)
*E03D 1/30* (2006.01)

(52) U.S. Cl.
CPC .............. *F16K 3/0254* (2013.01); *F16K 7/02* (2013.01); *F16K 31/22* (2013.01); *F16K 33/00* (2013.01); *E03D 1/142* (2013.01); *E03D 1/302* (2013.01); *F16K 1/308* (2013.01)

(58) Field of Classification Search
CPC ......... E03D 3/12; E03D 3/024; F16K 3/0281; F16K 3/0254; F16K 1/26; F16K 1/304; F16K 7/02; F16K 31/22; F16K 33/00; F16K 1/308; F04B 43/02
USPC ...................................... 4/325, 324, 398, 407
See application file for complete search history.

(56) References Cited

U.S. PATENT DOCUMENTS

| | | | | |
|---|---|---|---|---|
| 6,550,076 | B1* | 4/2003 | Fish | E03D 3/10 |
| | | | | 4/354 |
| 6,732,997 | B2* | 5/2004 | Beh | E03D 3/10 |
| | | | | 251/122 |
| 9,359,752 | B2* | 6/2016 | Le | E03D 1/304 |
| 9,512,603 | B2* | 12/2016 | Li | E03D 3/10 |
| 2004/0025238 | A1* | 2/2004 | Parsons | E03D 1/142 |
| | | | | 4/378 |
| 2005/0133754 | A1* | 6/2005 | Parsons | E03D 1/36 |
| | | | | 251/129.17 |
| 2005/0150038 | A1* | 7/2005 | Li | E03D 3/04 |
| | | | | 4/354 |
| 2014/0026309 | A1 | 1/2014 | Le et al. | |

FOREIGN PATENT DOCUMENTS

KR  10-0930420 B1  12/2009
WO  99-54563 A1  10/1999

* cited by examiner

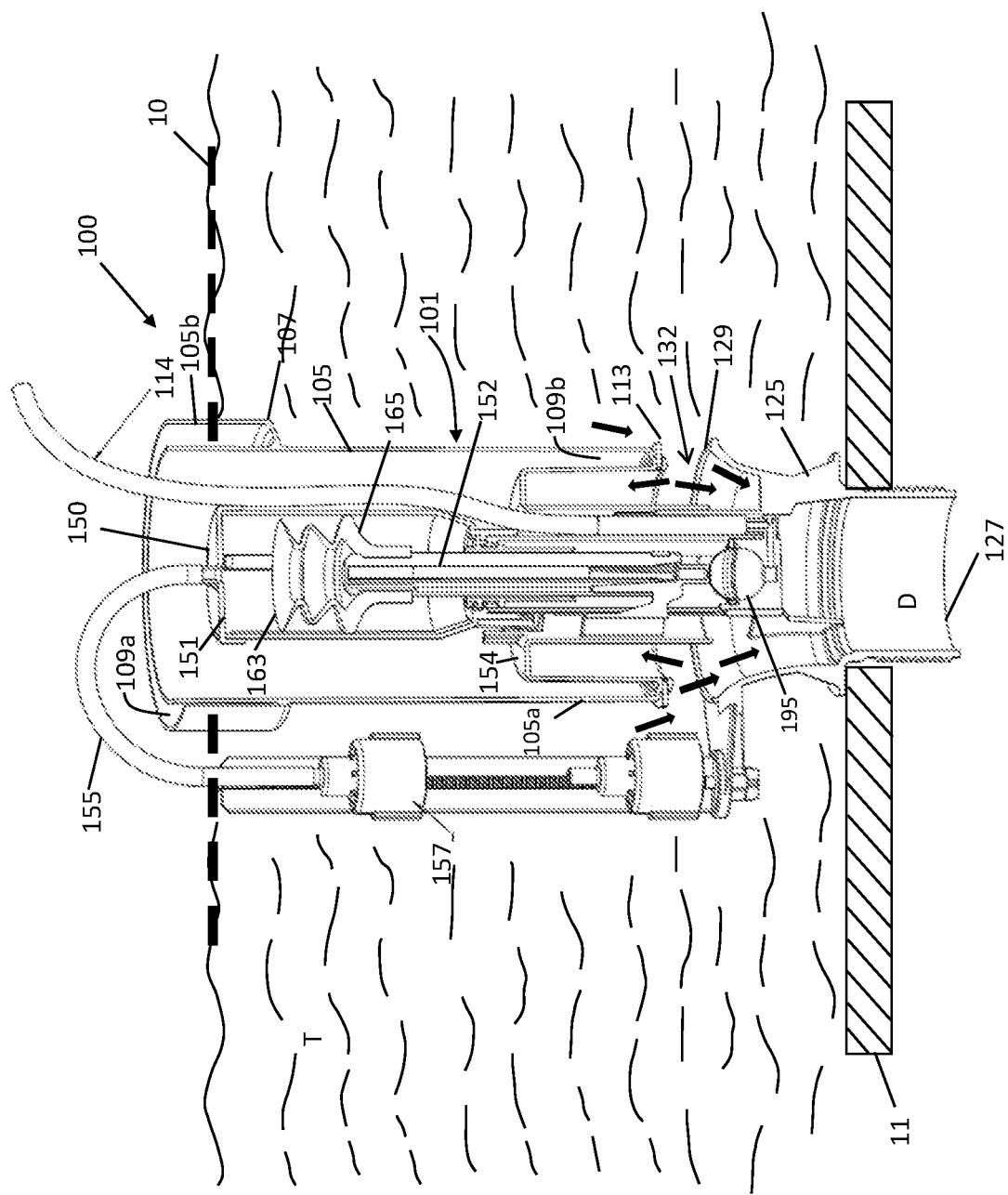

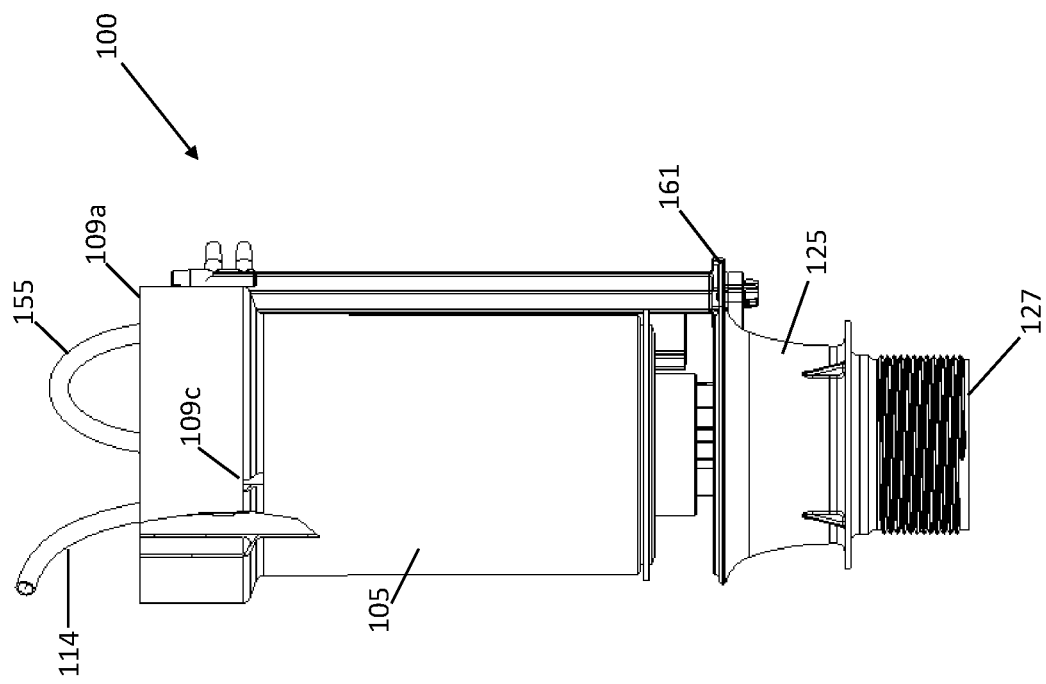

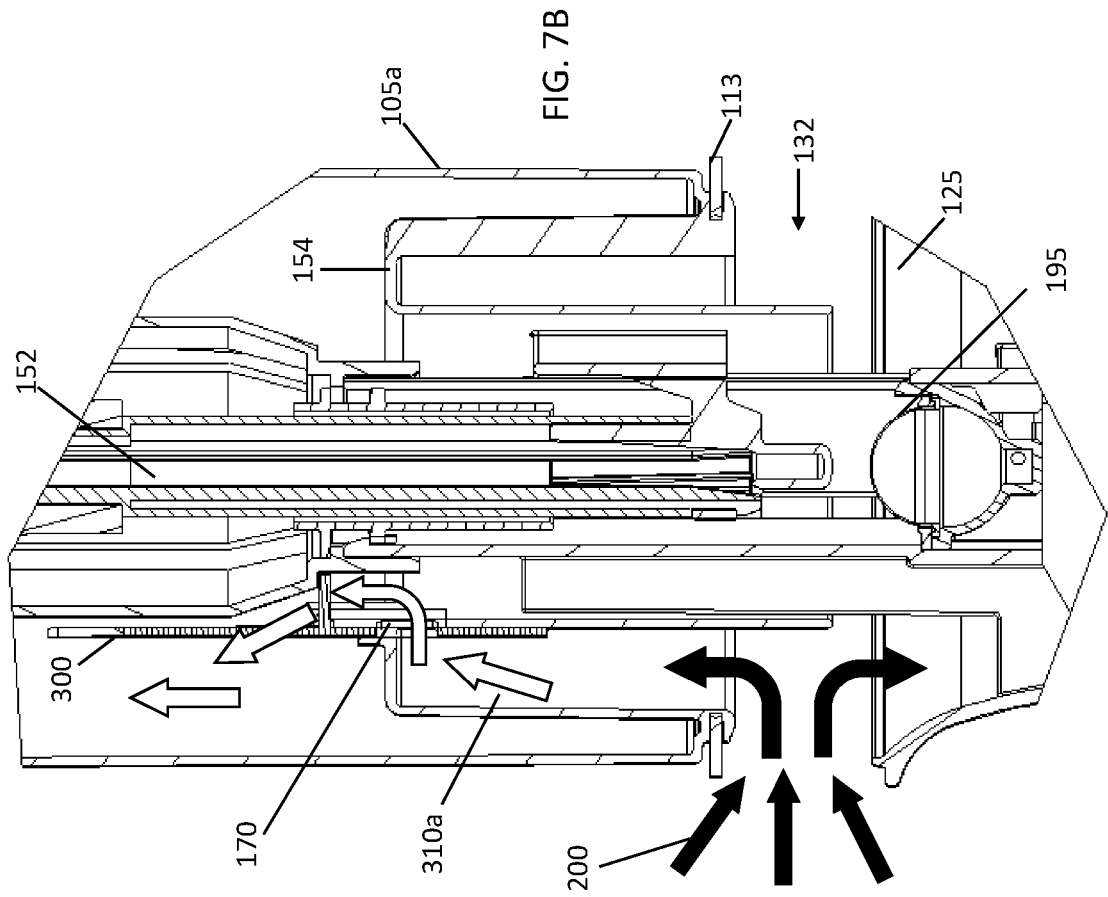
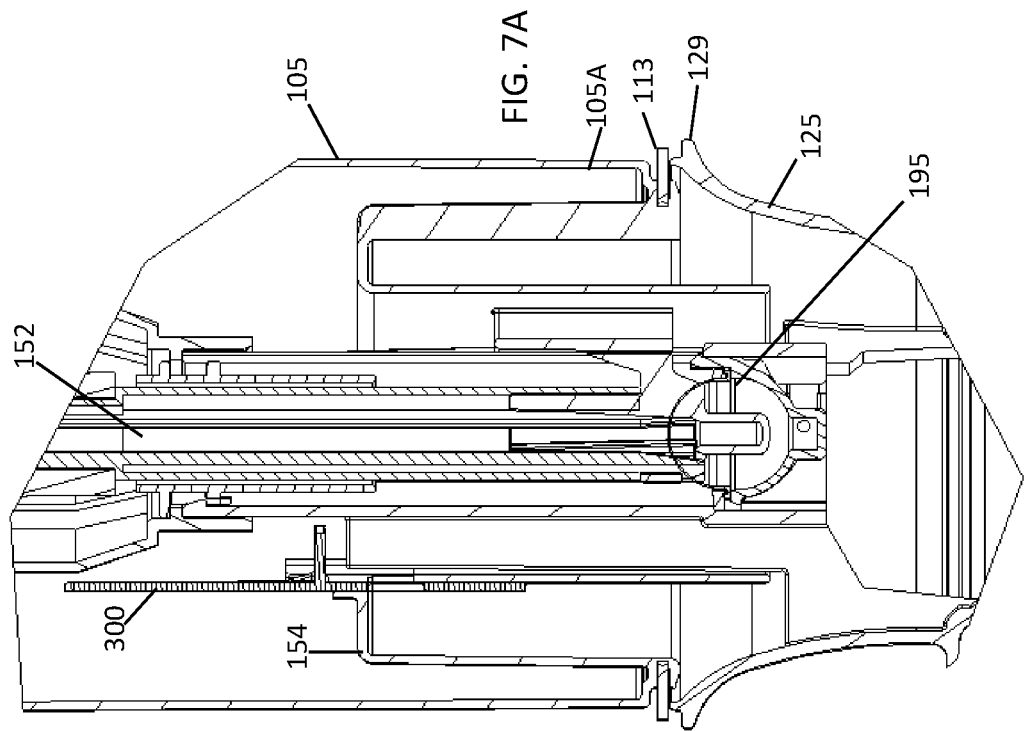

DISCHARGE VALVE SYSTEM AND METHOD

RELATED APPLICATIONS

This application claims priority to U.S. provisional application Ser. No. 62/567,653, filed on Oct. 3, 2017, the entire contents of which are incorporated herein by reference.

BACKGROUND

Conventional discharge valves generally require undesirably high activation forces, and often do not provide options to maintain an opening, to close adequately during small fluid level drops, to be useable with various flow rates, provide a short return stroke, and/or provide a positive closing action.

SUMMARY

Some fluid valve assembly comprising an outlet base dimensioned to be positioned at least partially through a drain in a fluid tank, and a float assembly including a moveable float. In some embodiments, the moveable float is configured to form an at least partially fluid-tight seal at a first end when the moveable float is coupled to the outlet base, and to form a flow opening when the moveable float is at least partially decoupled from the outlet base. Some embodiments include a housing positioned with the moveable float, where the housing encloses a suction device coupled to a moveable piston. Some embodiments include an actuable diaphragm positioned in the outlet base, and a compressed air tube or passageway coupled to one side the actuable diaphragm. In some embodiments, the actuable diaphragm is configured and arranged to be actuated by compressed air to move the moveable piston.

In some embodiments, as a result of movement of the moveable piston, the suction device comprises a suction cup configured to be deformed against an inner surface of the housing forming a vacuum chamber. In some embodiments, the seal comprises a coupling of a lower lip of the moveable float and an upper lip of the outlet base.

Some embodiments comprise a fluid sensor. Some further embodiments comprise an air tube or passageway coupled to the housing and fluidly coupling the fluid sensor to the housing. Some further embodiments comprise a lower ballast region at the first end of the moveable float positioned between an inner wall and an outer wall of the first end.

Some embodiments comprise an upper ballast region at a second end of the moveable float, where the upper ballast is positioned between inner and outer walls of the second end. In some embodiments, the lower ballast region is configured to gain fluid to form a weight ballast when the moveable float is decoupled from the outlet base and the flow opening is present with fluid flowing from the fluid tank through the drain.

Some embodiments further comprise an inverted cup element built couple or integrated with the float. In some embodiments, the inverted cup element is configured and arranged to generate buoyancy to lift from fluid flowing from the fluid tank when the flow opening is present. In some embodiments, the inverted cup element is configured and arranged to be exposed to atmospheric pressure when the float is not yet exposed to buoyant force. In some other embodiments, the inverted cup element includes an air vent.

Some embodiments include an fluid valve assembly comprising an outlet base dimensioned to be positioned at least partially through a drain in a fluid tank. Some embodiments include a float assembly including a moveable float, where the moveable float is configured to form an at least partially fluid-tight seal at a first end when the moveable float is coupled to the outlet base, and to form a flow opening when the moveable float is at least partially decoupled from the outlet base. Some embodiments include a housing positioned with the moveable float that encloses a suction device coupled to a moveable piston. Some embodiments further comprise an actuable diaphragm positioned in the outlet base.

Some embodiments include a compressed air tube or passageway coupled to one side the actuable diaphragm that is configured and arranged to be actuated by compressed air to move the moveable piston.

DESCRIPTION OF THE DRAWINGS

FIG. 5 is cross-sectional view of a discharge valve assembly in an initial cracking open position according to at least one embodiment of the invention.

FIG. 6 is a rear view of the discharge valve assembly according to at least one embodiment of the invention.

FIG. 7A is a partial cross-sectional view of the discharge valve assembly with float closed in accordance with some embodiments of the invention.

FIG. 7B is a partial cross-sectional view of the discharge valve assembly with float open in accordance with some embodiments of the invention.

DETAILED DESCRIPTION

Figure 1:
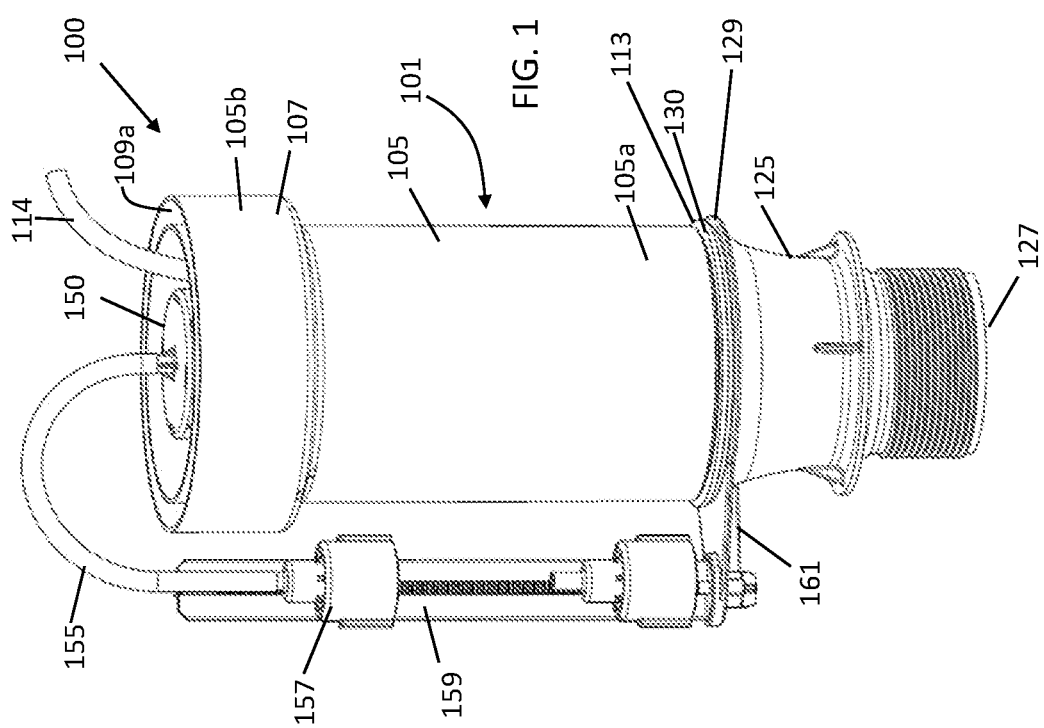
FIG. 1 is a perspective view of a discharge valve assembly in a closed position according to at least one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives which fall within the scope of embodiments of the invention.

Some embodiments include a discharge valve assembly for a fluid reservoir which requires a particular flowrate or different flowrates for fluid evacuation. In some embodiments, the discharge valve assembly 100 can shut off precisely and accurately at different fluid levels, substantially or completely independent of back pressure from the outlet. Further, some embodiments enable a small activation force to crack the seal open, and the seal pops up under the effect of a built in buoyancy or other force created by water or other fluid that travels upward inside the discharge valve assembly float.

Figure 2:
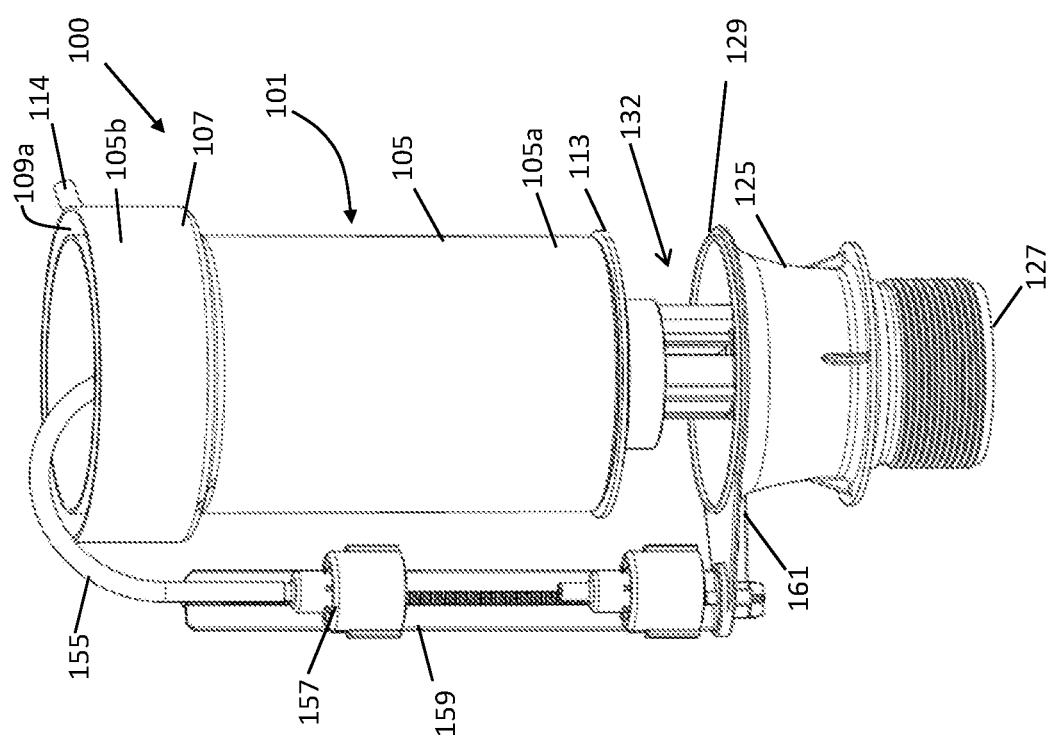
FIG. 2 is a perspective view of a discharge valve assembly in an open position according to at least one embodiment of the invention.
Figure 3:
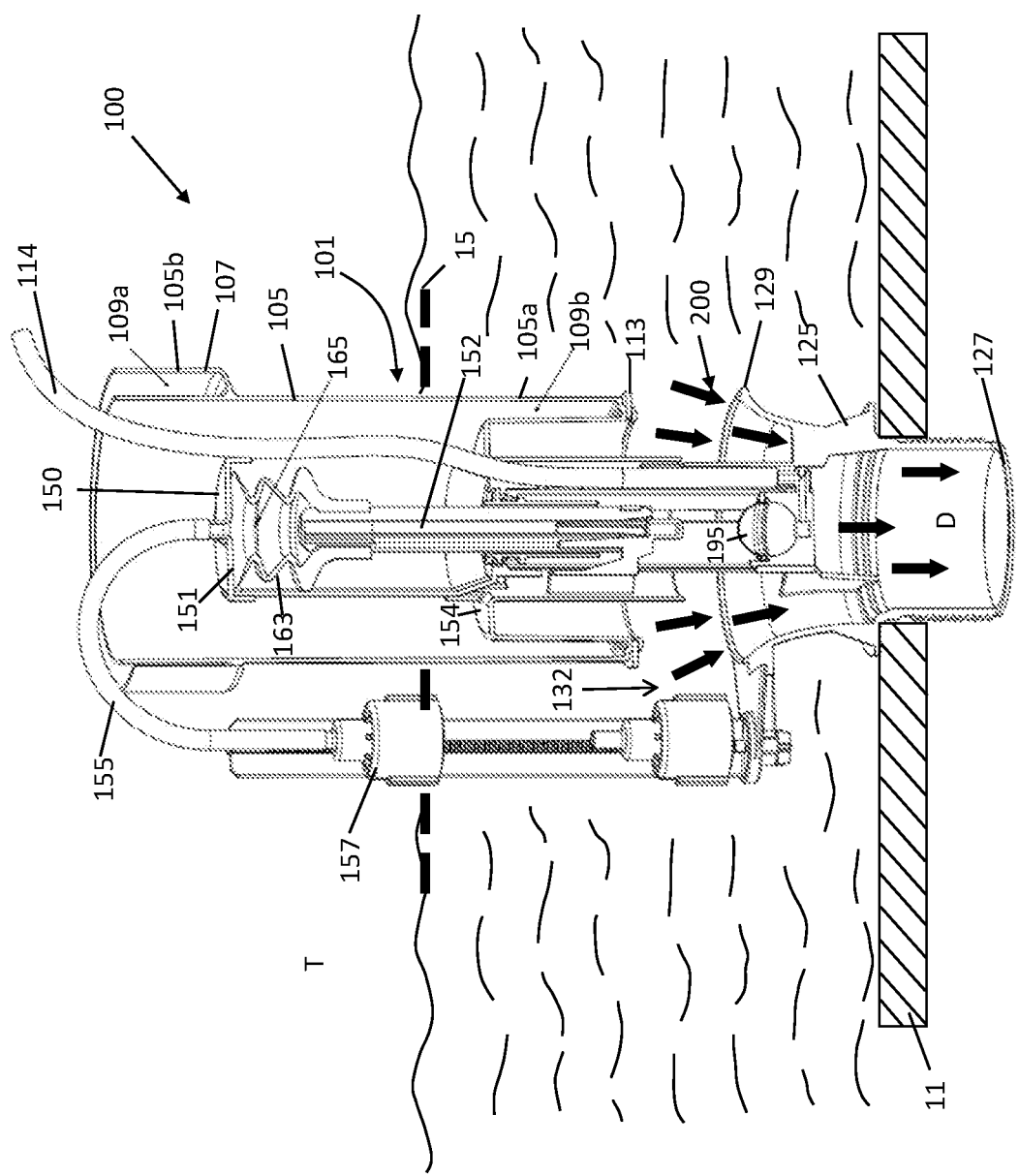
FIG. 3 is a cross-sectional view of a discharge valve assembly in a fully open position according to at least one embodiment of the invention.
Figure 4:
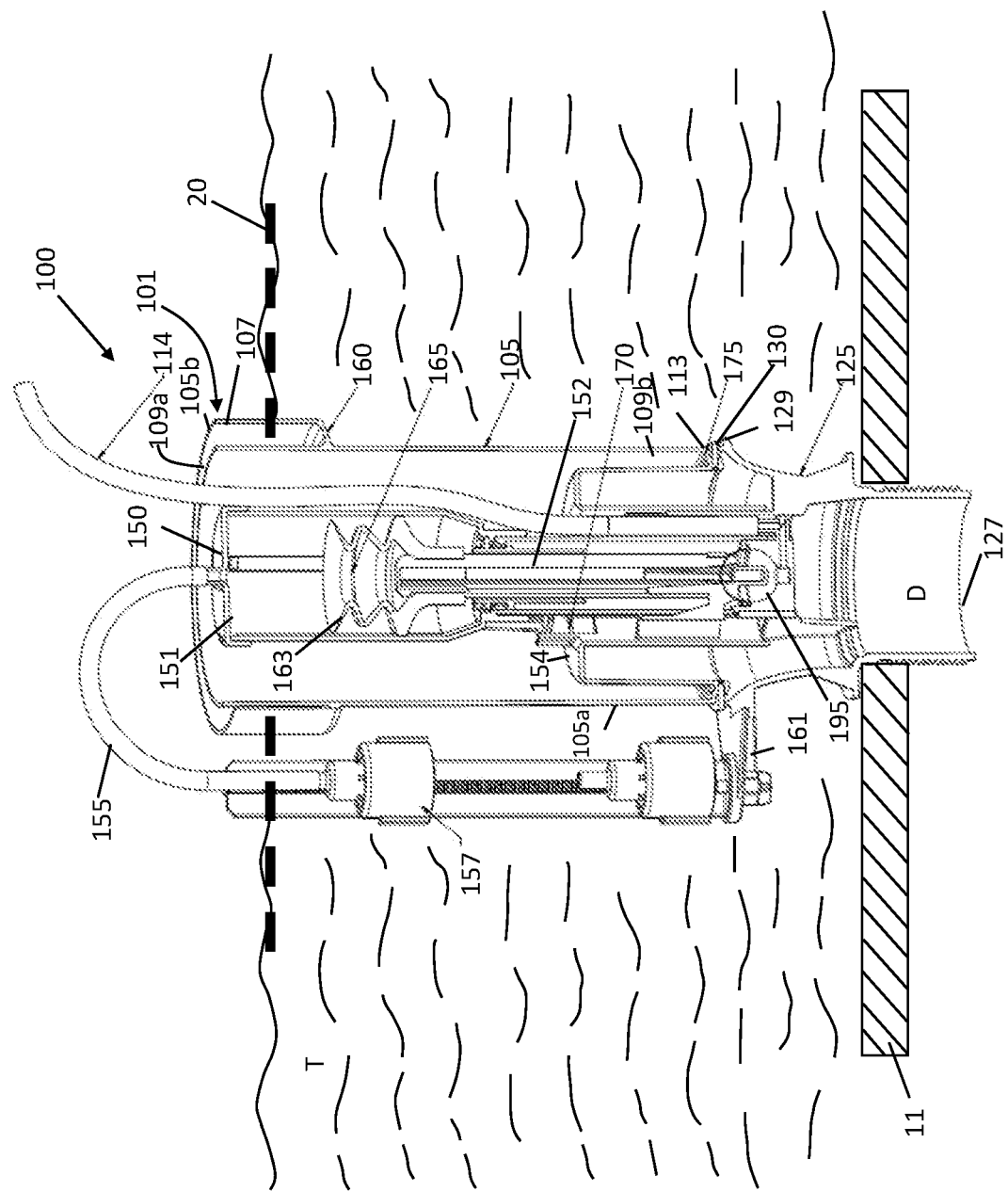
FIG. 4 is a cross-sectional view of a discharge valve assembly in a closed position according to at least one embodiment of the invention.

Referring to FIGS. 1-5, some embodiments of the invention provide a discharge valve assembly 100 with low activation force and shutoff controlled by fluid levels, where the activation force is typically much lower than (and often a small fraction of) the activation forces required by conventional designs. Some embodiments include a discharge valve assembly 100 that features an initial small activation force to crack open a drain seal. For example, in reference to FIG. 1 showing a discharge valve assembly 100 in a closed position, and FIGS. 3-5, showing the discharge valve assembly in various stages or states of operation, some embodiments comprise a float assembly 101 that can be positioned in a toilet tank T over a drain D. In some embodiments, the toilet bowl (not shown) can be positioned below drain D.

In some embodiments of the invention, the float assembly 101 can comprise a buoyant float 105 with lower lip 113 at the first end 105a. In some embodiments, the float 105 can be moveable up and down based on a user-actuated flush and/or a fluid level in the tank T. In some embodiments, the discharge valve assembly 100 can comprise an outlet base 125 including an outlet 127 and upper lip 129. The non-limiting embodiment shown in FIG. 1 shows the discharge valve assembly 100 in a closed position or state where the lower lip 113 of the float 105 of the float assembly 10 is coupled to the upper lip 129 of the outlet base 105 forming a seal 130. In some embodiments, fluid entering the tank T can at least partially surround the float assembly 101 (e.g., such as prior to a flush and/or at some point after a prior flush). In some embodiments, the two lips 127, 129 forming seal 130 can seal a drain D (thereby retaining water in tank T).

Some embodiments include a discharge valve assembly 100 that can fully extend to its full open stroke by itself to create adequate flowrate to evacuate fluid from a reservoir as intended. In other embodiments, the discharge valve assembly 100 can extend a portion of its stroke but still create adequate flowrates. For example, FIG. 2 is a perspective view of a discharge valve assembly 100 in an open position according to at least one embodiment of the invention. In some embodiments, the float 105 can move substantially upward based on a fluid level change in the tank T. In some embodiments, the fluid level change can be based on a user-actuated flush and/or a fluid level changing for other reasons in the tank T. In this instance, the float 105 can at least partially decouple from the outlet base 125 where the upper lip 129 of the outlet base 105 separates from the lower lip 113 of the float 105.

In some embodiments, the discharge valve assembly 100 can comprise an adjustable fluid level sensor 157. In some embodiments, the adjustable level sensor 157 can allow a wide range of adjustment to control the residual fluid level in the reservoir using adjustment mount 159. In some embodiments, the adjustment mount 159 can be coupled to an extension 161 that extends from the outlet base 125 adjacent the upper lip 129.

In some embodiments of the invention, the discharge valve assembly 100 can maintain an open position (e.g., such as the open position of the non-limiting embodiment of FIG. 2) until a preset fluid level is reached. In some embodiments, this can be accomplished and/or enabled using the above-mentioned adjustable level sensor 157. In some embodiments, the discharge valve assembly 100 can be quickly released to its closed position (e.g., as shown in the non-limiting embodiment of FIG. 1). Some embodiments include a system and apparatus to assist discharge valve assembly 100 closure during a small drop in fluid level.

In some embodiments, the discharge valve assembly 100 can be used for multiple applications that require different flowrates. For example, some embodiments of the discharge valve assembly 100 include a system and apparatus to adjust the open strokes of the discharge valve assembly 100 to control the flow rate at the outlet 127 of the outlet base 125 without changing the structure of the discharge valve assembly 100. In some embodiments, the discharge valve assembly 100 includes a very short turn-on stroke. Some embodiments provide a positive closing action.

Some embodiments of the invention can include a suction or vacuum generating device such as a suction cup 163 coupled to a piston 152 within inner housing 150 within the float 105 of the discharge valve assembly 100. In some embodiments, an evacuation of air from the suction cup 163 can create at least a partial vacuum which may result in the suction cup 163 contracting against at least one surface. For example, in some embodiments, the suction cup 163 can deform or move against an inner surface 151 of the inner housing 150, thereby sealing to form a vacuum chamber 165. In some embodiments, this vacuum chamber 165 can be connected to a level sensor 157 via an air tube 155 as shown in FIGS. 3, 4 and 5. In some embodiments, the level sensor 157 can be coupled to the discharge valve assembly 100 as shown, or can be located remotely and coupled to the discharge valve assembly 100.

As described earlier, in some embodiments of the invention, the float 105 can be moveable up and down based on a user-actuated flush and/or an otherwise changing fluid level in the tank T (where fluid flow 200 is marked by arrows). In reference to at least FIGS. 1, 3, and 5, in some embodiments, an activation force can be created by a pneumatic force on the piston 152 that is of sufficient magnitude to at least partially push the float 105 upward (i.e., away from the outlet base 125). In some embodiments of the invention, a pneumatic button (not shown) can be pushed or actuated by a user to cause or enable compressed air to flow in tube 114 to one side of a diaphragm 195.

In some embodiments, the pneumatic force on the piston 152 is of sufficient magnitude to overcome a downward force on the float 105 of the discharge valve assembly 100, and the float 105 can at least partially decouple from the outlet base 125 where the upper lip 129 of the outlet base 105 separates from the lower lip 113 of the float 105. In some embodiments, this action can occur quickly or instantly as demonstrated in FIG. 5, where a flow opening 32 can form between the float 105 and the outlet base 125. In some embodiments, as soon as the discharged fluid flows inside the float 105 (shown as arrows in FIG. 5), a vented inverted cup 154 built inside or coupled to the float 105 can generate enough buoyancy to lift the float 105 against the downward forces urging the float down during the closing stage to completely open the discharge valve assembly 100 (shown in FIG. 3). In some embodiments, this vacuum force can take over control of the motion of the float 105. In some embodiments, force created by the vacuum can hold the float at an open position until the fluid level in the tank T drops below the level sensor 157. At that point, air can enter the vacuum chamber 165 of the suction cup 163 through the level sensor 157 and the air tube 155 to relieve at least a portion of the negative pressure pulling on the float 105.

Some further embodiments include fluid ballast weights that can control buoyancy and/or movement of the float 105. For example, some embodiments include a ballast weight region 109*a* positioned at the upper section 107 of the float 105 (second end 105*b*), and generally positioned between an inner wall 183*a* and an outer wall 183*b*. Some further embodiments include a ballast weight region 109*b* at the first end 105*a*, positioned inside of the float 105 (marked as 109*b*) and generally positioned between inner wall 181*a* and outer wall 181*b*. In some embodiments, any fluid within either or both of the ballast weight regions 109*a*, 109*b* can comprise a ballast weight that can control buoyancy and/or movement of the float 105, and/or can force the float 105 downward. In some embodiments, as the float 105 reaches the outlet base 125, the discharge valve assembly 100 move back to a closed position or state where the lower lip 113 of the float 105 of the float assembly 10 is coupled to the upper lip 129 of the outlet base 105 forming a seal 130. Further, any replacement fluid entering the tank T can at least partially surround the float assembly 101 and the seal 130 can substantially seal a drain D.

In reference to FIG. 7A, showing a partial cross-sectional view of the discharge valve assembly with float closed in accordance with some embodiments of the invention, and FIG. 7B, showing a partial cross-sectional view of the discharge valve assembly with float open, in accordance with some embodiments of the invention, a built-in buoyancy cup or other fluid containing structure inside the float of the discharge valve assembly 100 can include an air venting capability or functionality (e.g., such as the sliding air gate 300 shown in FIG. 7B), so that when the valve is in a closed position (shown in FIG. 7A), the cup 154 can be exposed to atmosphere pressure while the float 105 is not yet exposed to buoyant force. Further, when the float 105 is cracked open (shown in FIG. 7B), the fluid can enter the inside chamber (shown as fluid 200) of the float 105 and the built-in buoyancy cup 154, producing a buoyant force. In some embodiments, the buoyant force that can lift the float 105 up, away from the sucking force, due to the flow downward into the opening of the base structure 125, to bring the float 105 to its fully open position. In some embodiments, at this time, the air venting system and apparatus (e.g., sliding air gate 300 will automatically open to vent the air (310) trapped inside the built-in buoyancy cup (310*a*) and allow fluid to enter this space. In some embodiments, the fluid then overspills through this air venting system and apparatus (sliding air gate 300) to at least partially fill the bottom fluid ballast weight (109*b*) of the float 105. This fluid ballast weight can be used to later close the valve. In some embodiments, the fluid ballast weight cup includes venting hole(s) (175) to drain the fluid after the valve is closed to remove the weight from the float 105 and be ready for the next cycle.

In some embodiments, the upper weight ballast of the float (marked as 109*a*) (e.g., as shown in FIGS. 3-5) can be submerged in the fluid reservoir when the discharge valve assembly 100 is at its closed position (shown in FIGS. 4 and 5). Further, it can include venting hole 109*c* along its wall (e.g., see FIG. 6). In some embodiments, when submerged, any fluid inside the upper weight ballast 109*a* does not exert force on the float 105. Further, when the float 105 is lifted to its open position, gravity force from the upper weight ballast 109*a* can apply a downward force on the float 105 to assist closing the discharge valve assembly 100 when the vacuum force is released from the system.

This upper weight ballast 109*a* is one example embodiment of a system and apparatus that can be used to push the float 105 down against residual fluid (shown as 15 in FIG. 3) in the tank T to achieve a small closing stroke for the discharge valve assembly 100 when fluid in the tank T is too high above the bottom weight ballast 109*b*. In another example embodiment generally equivalent to the upper weight ballast 109*a*, a conventional spring or other biasing member (not shown) that will be compressed when the float 105 is at its open position can be used to create a downward force on the float 105. In some embodiments, the combination of the upper weight ballast 109*a*, bottom weight ballast 109*b* and the adjustable level sensor 157 can allow a wide range of adjustment to control the residual fluid level in the tank T.

Some embodiments of the invention can utilize the buoyant force to open the discharge valve assembly 100 at the desired time, and then to make it disappear quickly or immediately afterward to remove its effects on the closing action of the float 105. Further, some embodiments of the invention can utilize a vacuum force generated by the upward motion of the float 105 to hold the float 105 at its open position.

Some further embodiments of the invention can create potential energy on the weight ballasts 109*a*, 109*b* to be ready for closing the discharge valve assembly 100 when the adjustable level sensor 157 releases the vacuum energy exerted on the float 105. Additionally, some embodiments of the invention can induce the potential energy from the weight ballasts 109*a*, 109*b* to be removed from the float 105 of the discharge valve assembly 100 after it is closed so that this potential energy will not need to be maintained during the closing time of the discharge valve assembly 100, and thereby not contributing to negative effects such as requiring extra activation force to overcome it during the opening stage. In some embodiments, any of the systems and methods disclosed herein can minimize the overall activation force to open the discharge valve assembly 100.

Some further embodiments include a method to control the open strokes of the float 105 of the discharge valve assembly 100 to control flowrates for different applications. In some embodiments, by adjusting a stop on the float 105 for its upward motion, the opening distance between the float 105 and the sealing surface (129) can be altered to change the discharge flowrate. In some embodiments, this method of adjusting the open stroke of the float 105 can be enabled by the vacuum force that is stronger than any sucking or dragging force on the float 105 if it is exposed to the stream of fluid flowing down into the outlet base 125.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description and figures, and the following claims.

The invention claimed is:

1. A fluid valve assembly comprising:
   an outlet base dimensioned to be positioned at least partially through a drain in a fluid tank;
   a float assembly including a moveable float, the moveable float configured to form an at least partially fluid-tight seal at a first end when the moveable float is coupled to the outlet base, and to form a flow opening when the moveable float is at least partially decoupled from the outlet base;
   a housing positioned with the moveable float, the housing enclosing a suction device coupled to a moveable piston;
   an actuable diaphragm positioned in the outlet base; and
   a compressed air tube or passageway coupled to one side the actuable diaphragm, the actuable diaphragm configured and arranged to be actuated by compressed air to move the moveable piston.

2. The fluid valve assembly of claim 1, wherein as a result of movement of the moveable piston, the suction device comprises a suction cup configured to be deformed against an inner surface of the housing forming a vacuum chamber.

3. The fluid valve assembly of claim 1, wherein the seal comprises a coupling of a lower lip of the moveable float and an upper lip of the outlet base.

4. The fluid valve assembly of claim 1, further comprising a fluid sensor.

5. The fluid valve assembly of claim 4, further comprising an air tube or passageway coupled to the housing and fluidly coupling the fluid sensor to the housing.

6. The fluid valve assembly of claim 1, further comprising a lower ballast region at the first end of the moveable float positioned between an inner wall and an outer wall of the first end.

7. The fluid valve assembly of claim 1, further comprising an upper ballast region at a second end of the moveable float, the upper ballast positioned between inner and outer walls of the second end.

8. The fluid valve assembly of claim 6, wherein the lower ballast region is configured to gain fluid to form a weight ballast when the moveable float is decoupled from the outlet base and the flow opening is present with fluid flowing from the fluid tank through the drain.

9. The fluid valve assembly of claim 1, further comprising an inverted cup element coupled or integrated with the float.

10. The fluid valve assembly of claim 9, wherein the inverted cup element is configured and arranged to generate buoyancy to lift from fluid flowing from the fluid tank when the flow opening is present.

11. The fluid valve assembly of claim 9, wherein the inverted cup element is configured and arranged to be exposed to atmospheric pressure when the float is not yet exposed to buoyant force.

12. The fluid valve assembly of claim 9, wherein the inverted cup element includes an air vent.

13. A fluid valve assembly comprising:
   an outlet base dimensioned to be positioned at least partially through a drain in a fluid tank;
   a float assembly including a moveable float, the moveable float configured to form an at least partially fluid-tight seal at a first end when the moveable float is coupled to the outlet base, and to form a flow opening when the moveable float is at least partially decoupled from the outlet base;
   a housing positioned with the moveable float, the housing enclosing a suction device coupled to a moveable piston; and
   an actuable diaphragm positioned in the outlet base.

14. The fluid valve assembly of claim 13, further comprising a compressed air tube or passageway coupled to one side of the actuable diaphragm, the actuable diaphragm configured and arranged to be actuated by compressed air to move the moveable piston.

* * * * *